(12) United States Patent
Boffa et al.

(10) Patent No.: US 9,395,275 B2
(45) Date of Patent: Jul. 19, 2016

(54) METHOD FOR CONTROLLING THE MANUFACTURING OF TYRES FOR WHEELS OF VEHICLES

(71) Applicant: PIRELLI TYRE S.P.A., Milan (IT)

(72) Inventors: Vincenzo Boffa, Milan (IT); Marco Gallo, Milan (IT); Bartolomeo Montrucchio, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 14/431,515

(22) PCT Filed: Sep. 26, 2013

(86) PCT No.: PCT/IB2013/058881
§ 371 (c)(1),
(2) Date: Mar. 26, 2015

(87) PCT Pub. No.: WO2014/049547
PCT Pub. Date: Apr. 3, 2014

(65) Prior Publication Data
US 2015/0241311 A1  Aug. 27, 2015

Related U.S. Application Data

(60) Provisional application No. 61/715,488, filed on Oct. 18, 2012.

(30) Foreign Application Priority Data

Sep. 27, 2012 (IT) .............................. MI2012A1613

(51) Int. Cl.
*B60C 1/00* (2006.01)
*G01M 17/02* (2006.01)
(Continued)

(52) U.S. Cl.
CPC ........... *G01M 17/027* (2013.01); *B29D 30/005* (2013.01); *G01J 5/02* (2013.01);
(Continued)

(58) Field of Classification Search
None
See application file for complete search history.

(56) References Cited

U.S. PATENT DOCUMENTS 3,952,195 A * 4/1976 Heisner .................. G01N 23/18
378/61
9,188,975 B2 * 11/2015 Ballabio ................ B29D 30/16
(Continued)

FOREIGN PATENT DOCUMENTS

DE    10 2008 023 936    8/2009
GB    2 296 335           6/1996
WO    WO 2011/159280     12/2011

OTHER PUBLICATIONS

International Search Report from the European Patent Office for International Application No. PCT/IB2013/058881, mailing date Feb. 6, 2014.
(Continued)

*Primary Examiner* — Andre Allen
(74) *Attorney, Agent, or Firm* — Finnegan, Henderson, Farabow, Garrett & Dunner, L.L.P.

(57) ABSTRACT

A method for controlling the manufacturing of tires for wheels of vehicles includes: extracting a cured tire from a curing station, in which the cured tire has accumulated heat during a curing process; and verifying the presence of possible defects or imperfections in that cured tire. The verification includes detecting first electromagnetic radiations representative of a heat emission from different portions of the cured tire while the cured tire frees the accumulated heat; providing at least one output signal representative of the first electromagnetic radiations detected to allow an analysis of the cured tire and to verify the presence of the possible defects or imperfections. A plant for the manufacturing of tires for wheels of vehicles is also described.

19 Claims, 5 Drawing Sheets

(51) Int. Cl.
*G01J 5/02* (2006.01)
*B29D 30/00* (2006.01)
*G01J 5/00* (2006.01)

(52) U.S. Cl.
CPC . *B29D2030/0027* (2013.01); *B29D 2030/0066* (2013.01); *G01J 2005/0077* (2013.01); *G01J 2005/0081* (2013.01)

(56) References Cited

U.S. PATENT DOCUMENTS

| | | | | |
|---|---|---|---|---|
| 2004/0069391 | A1* | 4/2004 | Okada | B29C 35/0272 152/450 |
| 2010/0006197 | A1* | 1/2010 | Kuroishi | B60C 11/0311 152/209.18 |
| 2011/0059237 | A1* | 3/2011 | Shibata | B29D 30/06 427/181 |
| 2013/0099123 | A1 | 4/2013 | De Amicis et al. | |
| 2014/0288689 | A1* | 9/2014 | Ballabio | B29D 30/16 700/99 |
| 2014/0352273 | A1* | 12/2014 | Park | D02G 3/48 57/292 |
| 2015/0226644 | A1* | 8/2015 | Boffa | G01M 17/027 356/237.5 |

OTHER PUBLICATIONS

Written Opinion of the International Searching Authority from the European Patent Office for International Application PCT/IB2013/058881, mailing date Feb. 6, 2014.

* cited by examiner

METHOD FOR CONTROLLING THE MANUFACTURING OF TYRES FOR WHEELS OF VEHICLES

CROSS REFERENCE TO RELATED APPLICATIONS

This application is a national phase application based on PCT/IB2013/058881, filed Sep. 26, 2013, which claims the priority of Italian Patent Application No. MI2012A001613, filed Sep. 27, 2012, and the benefit of U.S. Provisional Application No. 61/715,488, filed Oct. 18, 2012, the content of each application being incorporated herein by reference.

BACKGROUND OF THE INVENTION

1. Field of the Invention

The present invention refers to a method for controlling the manufacturing of tyres for wheels of vehicles.

The present invention refers also to a plant for the manufacturing of tyres for wheels of vehicles.

2. Description of the Related Art

The documents GB2296335 and WO2011/159280 describe methods for determining the structural integrity of a tyre.

Typically a tyre comprises a carcass structure provided with at least a carcass ply having folded end portions opposite to each other. Such end portions are engaged with respective anchoring annular structures, also called "beads", having an internal diameter substantially corresponding to the so-called "fitting diameter" of the tyre on a respective rim.

The tyre comprises also a belt structure, provided with one or more belt layers, radially overlapping each other and the carcass ply.

Each belt layer can be provided with textile and/or metal reinforcement cords, having a crossed orientation and/or substantially parallel to the circumferential extension direction of the tyre (zero-degree layer).

The tyre further comprises a tread band, made of elastomeric material as the other semi-finished products forming the structure of the tyre itself.

The tyre comprises also respective sidewalls, made of elastomeric material, applied in an axially external position with respect to the side surfaces of the carcass structure, each one of them extending from one of the side edges of the tread band up to the respective anchoring annular structure.

In the tyres of the "tubeless" type, a layer of airtight coating layer, called "liner", covers the internal surface of the tyre.

In the manufacturing of tyres, the components mentioned above are assembled on one or more building drums, in order to form a green tyre, which is then cured to form the finished tyre.

In the field of the manufacturing of tyres, the need is felt to perform quality controls on the products manufactured, having the twofold purpose of preventing the selling of defective tyres and of regulating progressively the apparatus and the machines used, in order to improve and optimize the performance of each step of the manufacturing process.

Such quality controls can be performed by human operators which, typically at the end of the production line, devote a predetermined time, for example between 30 s and 60 s, to a visual and tactile exam of the tyre. In case, in the light of his/her experience and sensitivity, the operator suspects that the tyre does not fulfil certain qualitative standards, the tyre itself is further tested, by means of appropriate equipment, in order to investigate the presence of possible structural and/or qualitative defects.

SUMMARY OF THE INVENTION.

The Applicant has noticed that some types of tyre defects, such as for example air and/or foreign bodies inclusions, and the presence of "under-cured" parts (i.e. portions of tyres where the curing operation was not performed correctly or thoroughly) are characterized by a different thermal conductivity and inertia with respect to the other parts of the tyre.

The Applicant has also verified that such defective portions of the tyre have a different cooling gradient when the pneumatic itself, after an increase of its temperature, releases the accumulated heat and tends to return to a lower temperature (e.g. ambient temperature).

The Applicant thus had the intuition that, in order to identify possible defects and/or imperfections of the tyre, the heat released by the tyre itself after the curing operations can be advantageously used.

More precisely, the Applicant found that possible defects or imperfections can be identified by detecting electromagnetic radiations in the infrared band, coming from the tyre leaving the curing station, said electromagnetic radiations being emitted by the tyre, when the latter releases the heat accumulated during the curing.

As a function of such detected radiations, a thermal distribution profile of the cured tyre can be reconstructed, which, once examined by a human operator and/or by means of an automated structure, allows to identify areas of the tyre characterized by a different emission from the one expected, and thus having an undesired configuration.

According to a first aspect, the present invention is aimed to a method for controlling the manufacturing of tyres for wheels of vehicles comprising:

extracting a cured tyre from a curing station, in which said cured tyre has accumulated heat during a curing process;

verifying the presence of any defects or imperfections in said cured tyre, wherein said verification comprises:

detecting first electromagnetic radiations representative of heat emission from different portions of said cured tyre while said cured tyre is releasing said accumulated heat;

providing at least one output signal representative of said first electromagnetic radiations detected, in order to allow an analysis of said cured tyre and to verify the presence of said any defects or imperfections.

According to a further aspect, the present invention is aimed to a plant for manufacturing tyres for wheels of vehicles, comprising:

one or more building stations for the production of green tyres;

at least one curing, station adapted to receive as input said green tyres and to output cured tyres, wherein said cured tyres accumulate heat during a curing process;

at least one control station operatively associated with said at least one curing station and adapted to verify the presence of any defects or imperfections in said cured tyres, comprising:

a detection structure for detecting first electromagnetic radiations representative of heat emission from different portions of at least one of said cured tyres while said at least one of said cured tyres is releasing said accumulated heat;

a transmission module for providing at least one output signal representative of said first electromagnetic radiations detected, so as to allow an analysis of said cured tyre and a verification of the presence of any defects or imperfections in said at least one of said cured tyres.

Advantageously, possible defects and/or imperfections of the tyre, due for example to air and/or foreign bodies inclusions and/or to the presence of "under-cured" parts, can promptly be identified already at the output of the curing station, in an easy and reliable way, and without affecting significantly the time needed to perform the whole manufacturing process.

The control station, indeed, can be arranged immediately downstream of the curing station. The fact of operating immediately downstream of the curing station, in order to exploit the residual of the heat accumulated by the tyre in the station itself, allows to perform substantially immediate tests, reducing significantly the time necessary to intervene on the process (e.g. on the setting of the building stations and/or of the curing station) in order to make the appropriate changes, so that the defects and/or the anomalies noticed on the tyre examined will not be repeated on an undue number of tyres built subsequently.

In accordance with one or more of the aspects mentioned above, the invention may comprise one or more of the preferred features described herebelow.

Said first electromagnetic radiations are infrared radiations having a wavelength preferably comprised between 5 µm and 20 µm.

Preferably, said at least one output signal is sent to a display unit to display a thermographic image of said cured tyre defined by the detection of said first electromagnetic radiations.

Thus an operator, by examining the images provided by said display unit, can detect the presence of defects and/or anomalies in the tyre.

Preferably, at least one parameter representative of said first detected electromagnetic radiations is determined; after that said at least one parameter and at least one respective predetermined reference parameter are compared. A notification signal can be preferably generated as a function of said comparison.

Thus an at least partially automated test can be performed, wherein the presence of defects and/or anomalies can be identified by an electronic system suitably configured to operate on said at least one output signal obtained by said first detected electromagnetic radiations.

Preferably said at least one parameter is descriptive of a heat distribution emitted by at least one surface of said cured tyre.

In particular said parameter can be the temperature of the portion of tyre considered.

Preferably, the values of said parameter at the different pneumatic portions define the heat distribution profile of the tyre itself.

Preferably said at least one reference parameter comprises one or more parameters representative of detections carried out on one or more tyres other than said cured tyre.

Thus the heat distribution of the examined tyre can be compared to the one of other tyres, in order to identify non-standard behaviours in terms of heat emission.

Preferably said at least one reference parameter comprises one or more parameters representative of detections carried out on one or more different parts of said cured tyre (for example belonging to the same component).

Thus it is possible to verify if the tyre has a uniform behaviour, in terms of heat distribution and of the consequent heat emission, within homogeneous areas which should have uniform characteristics.

Furthermore, this embodiment allows to perform a reliable analysis of the cured tyre also when there is no pre-stored model representative of an ideal tyre substantially devoid of defects or anomalies, which can be used for comparison with the detections carried out.

This is particularly advantageous considering that preparing a model of the type indicated above can be very complex and expensive, since the tyre, due to its own nature, is not a rigid object and thus does not have a univocal configuration.

Preferably, said at least one reference parameter comprises one or more data representative of a defect or anomaly previously stored and/or directly identified, so that the latter can be easily identified, in case it was detected again during the analysis.

By way of example, said at least one reference parameter can comprise one or more data representative of an air inclusion which can be present in said tyre.

Preferably, said at least one reference parameter comprises one or more pre-stored parameters.

Thus it is possible to compare the actual behaviour of the tyre with parameters representative of an ideal behaviour, or at least an expected behaviour, of the tyre itself.

Preferably, the detection of said first electromagnetic radiations comprises one or more of the following operations:
  detecting a first portion of first electromagnetic radiations, emitted by a tread band of said cured tyre;
  detecting a second portion of first electromagnetic radiations, emitted by a carcass structure and/or by a liner of said cured tyre;
  detecting a third portion of first electromagnetic radiations, emitted by at least a first sidewall of said cured tyre.

Preferably, the detection of the first portion of the first electromagnetic radiations comprises:
  rotatably moving said cured tyre relative to at least a first detection device, which is configured and active to detect the first portion of said first electromagnetic radiations, and is arranged in a radially external position with respect to said tread band.

Thus it is possible to carry out a circumferentially complete detection of the electromagnetic radiations emitted by the tread band.

Preferably, the detection of the second portion of the first electromagnetic radiations comprises:
  rotatably moving said cured tyre relative to a second detection device, which is configured and active to detect the second portion of said first electromagnetic radiations, and is arranged in a radially internal position with respect to said carcass structure and/or said liner.

Thus it is possible to carry out a circumferentially complete detection the electromagnetic radiations emitted by the carcass structure and/or by the liner.

Preferably said first and/or said second detection device are activated during the same rotation movement of said cured tyre.

Thus it is possible to optimize the analysis, making the latter rapid and efficient.

Preferably, the detection of the third portion of the first electromagnetic radiations comprises:
  rotatably moving said cured tyre relative to a third detection device, which is configured and active to detect the third portion of said first electromagnetic radiations and is arranged in front of at least one portion of said at least one first sidewall.

Thus it is possible to carry out a circumferentially complete detection of the electromagnetic radiations emitted by said at least a first sidewall.

Preferably said third detection device is activated during a rotation movement of said cured tyre, while also said first detection device and/or said second detection device are active.

Preferably, the detection of said first electromagnetic radiations may comprise the detection of a fourth portion of first electromagnetic radiations, emitted by a second sidewall of said cured tyre.

Preferably, the detection of the fourth portion of said first electromagnetic radiations comprises:
  rotatably moving said cured tyre relative to a fourth detection device, which is configured and active to detect the fourth portion of said first electromagnetic radiations and is arranged in front of at least one portion of said second sidewall.

Thus it is possible to carry out a circumferentially complete detection of the electromagnetic radiations emitted by said second sidewall.

Preferably the method according to the invention further comprises a movement of said cured tyre between a first operating position, in which said third detection device is in front of at least one portion of said at least a first sidewall to detect the third portion of said first electromagnetic radiations, and a second operating position, in which said fourth detection device is in front of at least one portion of said second sidewall to detect the fourth portion of said first electromagnetic radiations.

Preferably, after the detection of said first electromagnetic radiations, the method comprises:
  heating one or more portions of said cured tyre by means of second electromagnetic radiations;
  detecting third electromagnetic radiations emitted by said one or more portions while the latter are releasing the heat accumulated by receiving the second electromagnetic radiations;
  generating, as a function of said third electromagnetic radiations, a verification signal representative of the verification carried out on said portions of said cured tyre.

Thus it is possible to carry out a further verification of the information embedded in the output signal.

Preferably, before heating said one or more portions of said cured tyre, said one or more portions are identified as a function of said output signal.

Thus it is possible to reduce the execution time and the energy consumption associated to said further verification, since it can be carried out by focusing on the portions of cured tyre that, according to what determined as a function of the first detected electromagnetic radiation, can have defects and/or imperfections.

Preferably, said output signal is configured to display, by means of a respective display unit, a thermographic image of said cured tyre defined by the detection of said first electromagnetic radiations.

Preferably said control station comprises:
  a memory for storing at least one reference parameter;
  a processing unit configured to determine at least one parameter descriptive of said first electromagnetic radiations detected, in order to carry out a comparison between said at least one descriptive parameter and said at least one reference parameter, and to generate a notification signal as a function of said comparison.

Preferably said detection structure comprises:
  at least a first detection device, which is configured to detect the first portion of said first electromagnetic radiations, and is arranged in a radially external position with respect to a tread band of said cured tyre;
  a first drive member associated with said first detection device and with said at least one of said cured tyres to rotatably move the latter in relation to said first detection device.

Preferably, said detection structure comprises a second detection device, which is configured to detect the second portion of said first electromagnetic radiations, and is arranged in a radially internal position with respect to a carcass structure and/or a liner of said cured tyre.

Preferably said second detection device is active to detect the second portion of the first electromagnetic radiations emitted by said carcass structure and/or by said liner when said first drive member is active for said rotation movement of said cured tyre.

Preferably said detection structure comprises at least one among:
  a third detection device, which is configured to detect the third portion of said first electromagnetic radiations and is arranged in front of at least one portion of a first sidewall of said cured tyre;
  a fourth detection device, which is configured to detect a fourth portion of said first electromagnetic radiations and is arranged in front of at least one portion of a second sidewall of said cured tyre, said fourth portion of the first electromagnetic radiations being emitted by said second sidewall.

Preferably said detection structure comprises a second drive member for moving said cured tyre between a first operating position, in which said at least one portion of the first sidewall is in front of said third detection device, and a second operating position, in which said at least one portion of the second sidewall is in front of said fourth detection device.

Preferably said detection structure further comprises a third drive member associated to said fourth detection device and with said cured tyre to rotatably move the latter relative to said fourth detection device.

Preferably said control station comprises a source adapted to emit second electromagnetic radiations to heat one or more portions of said at least one of said cured tyres, said detection structure being configured to detect third electromagnetic radiations emitted by said one or more portions while the latter are releasing the heat accumulated by receiving said second electromagnetic radiations, said control station being adapted to generate, as a function of said third electromagnetic radiation, a verification signal representative of the verification carried out on said one or more portions.

BRIEF DESCRIPTION OF THE DRAWINGS

Further characteristics and advantages will become more clear from the detailed description of a preferred, but not limitative, embodiment of the invention. Such description is provided in the following with reference to the attached figures, given by way of example and thus not limitative, wherein.

DETAILED DESCRIPTION OF THE INVENTION

With reference to the attached figures, 1 indicates a plant for manufacturing tyres according to an aspect of the present invention.

The plant 1 (FIG. 1) comprises one or more building stations 10 for the production of green tyres GT.

Figure 1:
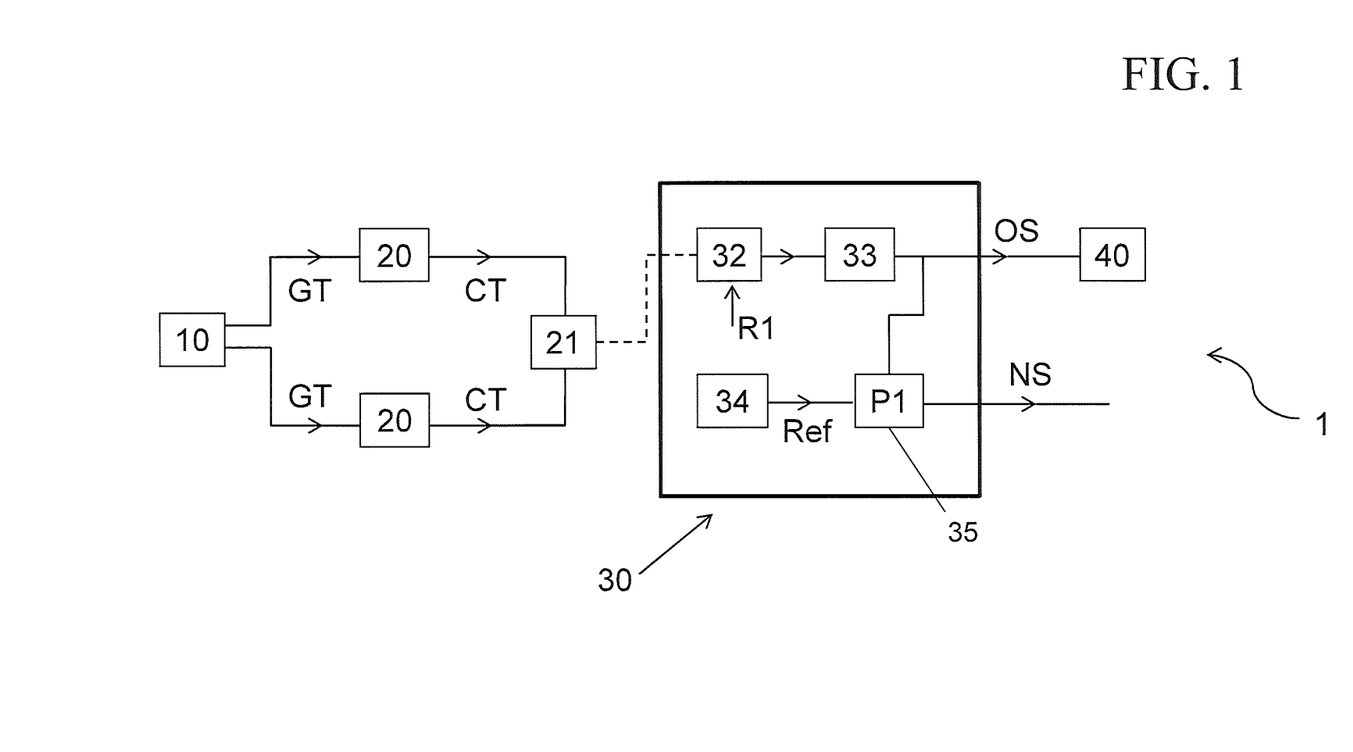
FIG. 1 shows a block diagram of a plant for manufacturing tyres in accordance with an aspect of the invention.

Such green tyres GT are obtained by assembling the different parts of each tyre (carcass structure, belt structure, tread band, sidewalls, liner, etc.) on one or more building drums.

The green tyres GT are then provided in input to at least one curing station 20 adapted to output corresponding cured tyres CT.

In the present context, "curing station" refers generically to any set of apparatuses dedicated to the transformation of a green tyre into a finished tyre. By way of example, the curing station 20 can comprise a curing unit, comprising, in turn, a mold formed by a pair of half-shells or rings positioned opposite to each other, adapted at least to mold the area of the sidewalls of the tire. Typically, a curing unit comprises a plurality of sectors circumferentially placed one next to the other, for the molding of the tread band of the tyre. The curing unit further comprises a vulcanization bladder that, due to the action of appropriate inflation gases, exerts a direct thrust on the tyre walls towards the internal surfaces of the mold, so that the tyre itself can take the desired configuration.

The curing unit further comprises a heating system, to bring the tyre to the temperatures necessary to the curing process.

The curing unit typically comprises an exhaust gas system, to allow the discharging of the gas used in the vulcanization bladder.

The curing unit typically comprises a control system configured to manage the operation of the different parts that form the curing unit itself.

The curing station 20 can also comprise other apparatuses necessary to complete the transformation of the tyre from green to finished. For example, the curing station 20 may comprise one or more post-curing apparatuses adapted to complete the cross-linking of the tyre in output from the curing unit.

The plant 1 further comprises a control station 30, where cured tyres CT are brought after their extraction from the curing station 20.

The control station 30 is advantageously equipped with a detection structure 32 to detect first electromagnetic radiations R1 emitted by at least one of said cured tyres CT.

Figure 2A:
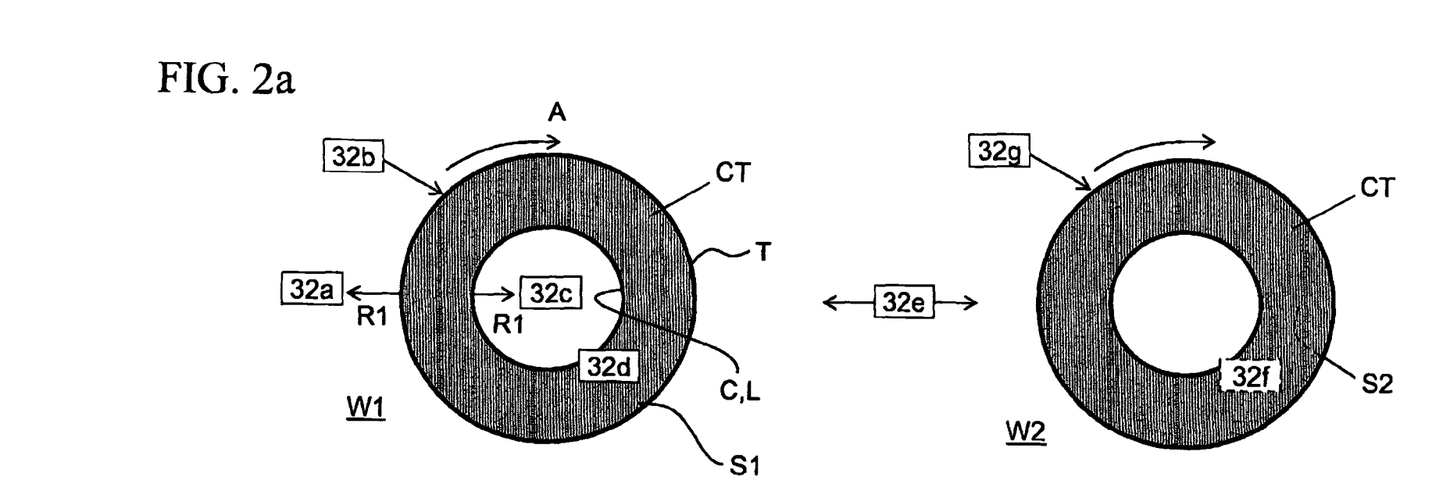
FIG. 2a shows, in a schematic plan view, some parts of the plant of FIG. 1 active on a cured tyre in two different operating positions.

To detect a first portion of the first electromagnetic radiations R1, emitted by the tread band (namely by the radially outer surface of the cured tyre CT), the detection structure 32 can be provided with a first detection device 32a (FIG. 2a).

Preferably, the first detection device 32a is positioned in a radially external position with respect to the tread band T. In particular, the first detection device 32a is arranged in front of at least one portion of the tread band T so as to detect said first portion of the first electromagnetic radiations R1.

Preferably, the detection structure 32 is equipped with a first drive member 32b.

Figure 3:
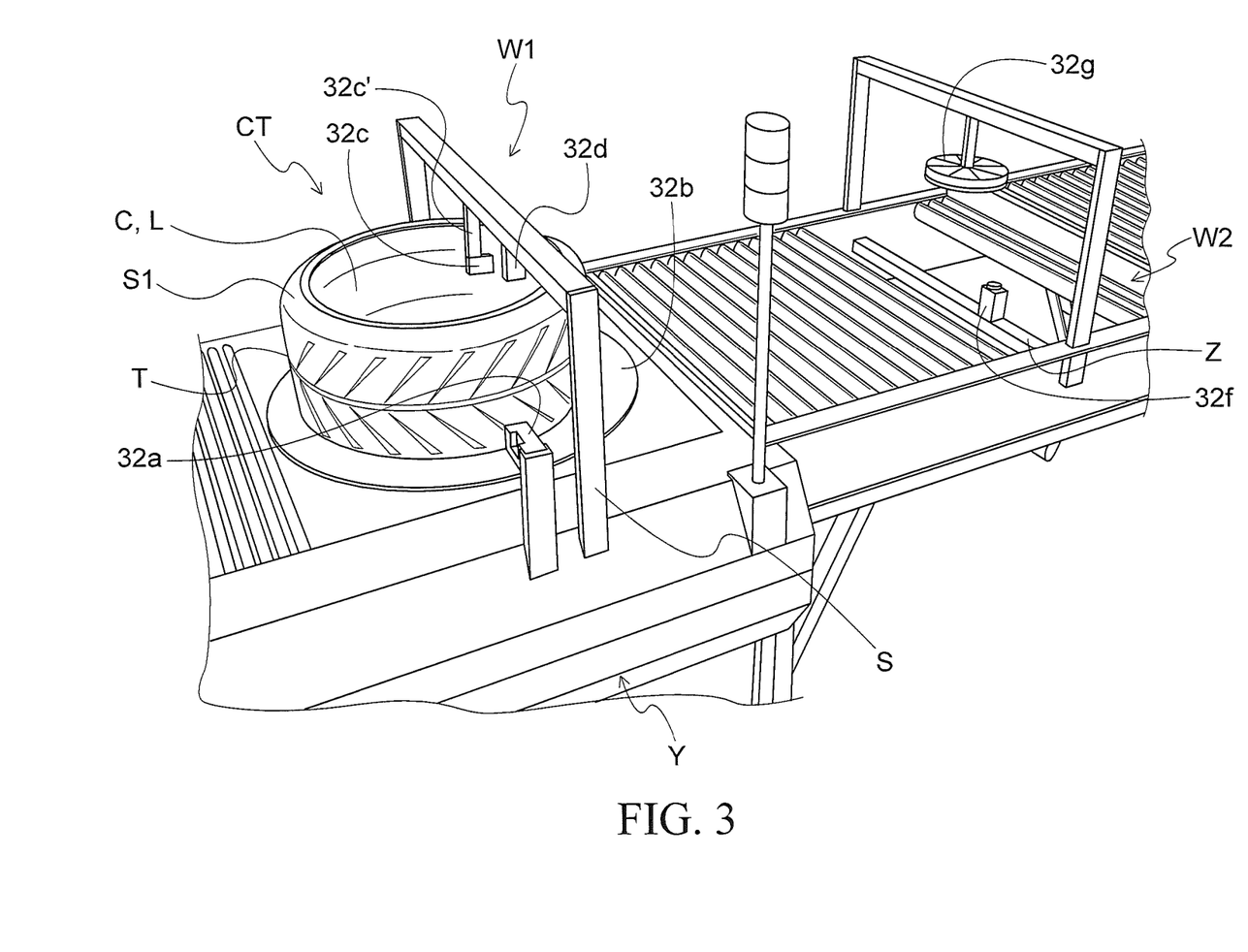
FIG. 3 schematically shows an embodiment of a station of the plant of FIG. 1.

In an embodiment, schematically shown in FIG. 3, the first drive member 32b can be made as a rotating plate, on which the cured tyre CT is positioned to allow said first detection device 32a to detect the first portion of the first electromagnetic radiations R1. Preferably, the first detection device 32a is substantially integral with a frame Y of the control station 30.

To detect a second portion of the first electromagnetic radiations R1, emitted by the carcass structure C and/or by the liner L, the detection structure 32 can be provided with a second detection device 32c.

The second detection device 32c is positioned in a radially internal position with respect to the carcass structure C and/or to the liner L.

Advantageously the second detection device 32c is arranged in front of at least one portion of the carcass structure C and/or of the liner L.

In an embodiment schematically shown in FIG. 3, the second detection device 32c can be mounted on an suitable support element 32c'.

The support element 32c', which may comprise for example a telescopic arm, causes a substantially vertical movement of the second detection device 32c, moving it upwards when the cured tyre has to be positioned, and then moving it downwards when it is necessary to detect the second portion of the first electromagnetic radiations R1, so that the second detection device 32c is arranged in front of at least a portion of the carcass structure C and/or of the liner L.

In order to detect a third portion and/or a fourth portion of the first electromagnetic radiations R1 emitted respectively by a first sidewall S1 and/or by a second sidewall S2 of the cured tyre CT, the detection structure 30 may comprise a third and/or a fourth detection device 32d, 32f.

In particular, in order to detect the third portion of the first electromagnetic radiations R1, the third detection device 32d is used, which is arranged in front of at least one portion of said first sidewall S1.

As schematically shown in FIG. 3, the third detection device 32d can be integrally mounted on a support structure S being part of the frame Y.

In order to detect the fourth portion of the first electromagnetic radiations R1, the fourth detection device 32f is used, which is arranged in front of at least one portion of said second sidewall S2.

As schematically shown in FIG. 3, the fourth detection device 32f can be integrally supported by a rod Z being part of the frame Y.

Preferably, the third and the fourth detection device 32d, 32f operate when the cured tyre CT is in different positions within the control station 30. The detection structure 32 is thus preferably provided with a second drive member 32e (schematically shown in FIG. 2a, 2b) to move the cured tyre CT between a first operating position W1 wherein the first sidewall S1 is in front of the third detection device 32d, and a second operating position W2, wherein the second sidewall S2 is in front of the fourth detection device 32f.

Figure 2B:
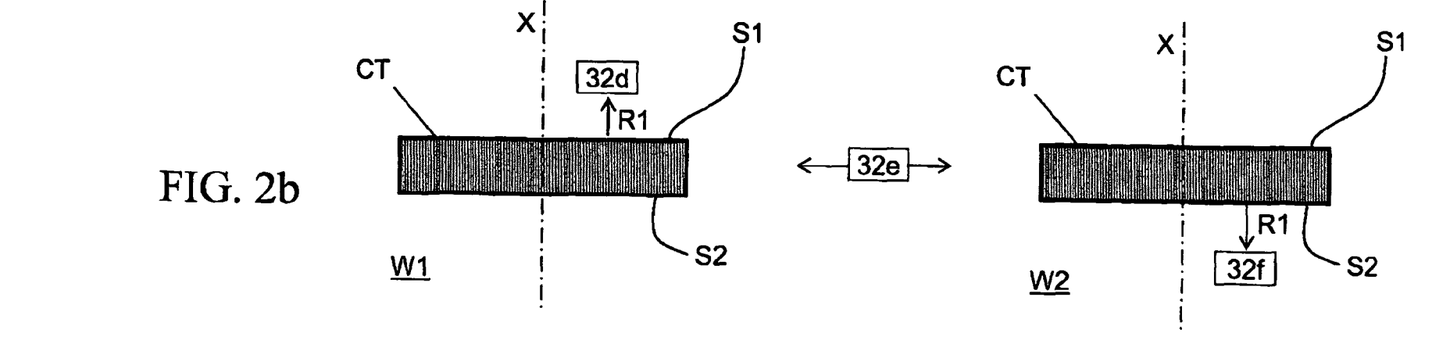
FIG. 2b shows, in a schematic side view, some of the parts shown in FIG. 2a active on the cured tyre in the same operating positions.

In practice, the second drive member 32e may comprise a robotized arm, appropriately structured and controlled to move the cured tyre CT towards the fourth detection device 32f.

In addition, or as an alternative, the second drive member 32e may comprise a motorized belt and/or a plurality of motorized rollers (schematically shown in FIG. 3), which may advantageously contribute to the movement from the first to the second operating position W1, W2.

Advantageously, the cured tyre CT is rotatably moved, relative to the fourth detection device 32f, by a third drive member 32g. The latter can be realized, for example, as a rotating plate, or as a rotating rod equipped with tongs extending in radial direction (schematically shown in FIG. 3), in order to take the tyre (for example at the beads of the latter) and rotatably drive it.

Preferably, the third drive member 32g acts on the cured tyre CT when the latter is in the second operating position W2.

In a preferred embodiment, the first and/or the second and/or the third and/or the fourth detection device 32a, 32c, 32d, 32f can be realized as digital cameras, preferably adapted to detection in the range of infrared radiations.

Preferably the control station 30 comprises a transmission module 33, associated to the detection structure 32 and configured to provide at least one output signal OS, representative of said first detected electromagnetic radiations R1, in order to allow an analysis of said cured tyre CT and a verification of the presence of any defects or imperfections in the latter.

In an embodiment, the control station 30 comprises a display unit 40 which, once it has received the output signal OS, displays a thermographic image of said cured tyre representative of the first detected electromagnetic radiations R1.

In addition or as an alternative to said display unit 40, the control station 30 may comprise a memory 34, to store at least one reference parameter Ref, and a processing unit 35. The latter is configured to determine a parameter P1 descriptive of the first electromagnetic radiations R1, and to carry out a comparison between such parameter P1 and the reference parameter Ref; as a function of such comparison, the processing unit 35 generates a notification signal NS.

In an aspect, the method according to the invention comprises first of all an extraction of a cured tyre CT from the curing station 20.

This operation is performed at the end of the tyre curing.

By way of example, the extraction can be performed by opening a curing unit, being part of the curing station 20, and transporting the cured tyre CT by means of drive members 21 such as, for example, transport rollers and/or belts.

In some embodiments, the curing operated by the curing station 20 may comprise one or more post-curing operations aiming to complete the cross-linking of the tyre in output from the curing unit.

The extracted cured tyre CT is thus positioned so that it can be subjected to the verification of the presence of possible defects/anomalies.

In particular, first electromagnetic radiations R1 emitted by the cured tyre CT are detected, while the cured tyre CT itself is releasing the residual of the heat accumulated during the curing process.

During the curing process, indeed, the green tyre GT is brought to temperatures comprised between about 100° C. and about 250° C.; once the curing process has ended, the cured tyre CT has thus a temperature far higher than the ambient temperature and, since it tends to re-establish a thermal balance with the surrounding environment after being extracted from the curing unit, it releases the residual of the accumulated heat.

It is by means of the mentioned first electromagnetic radiations R1 that the cured tyre CT releases the residual of the accumulated heat.

The detection of the first electromagnetic radiations R1 is preferably carried out within a time comprised between about 15 minutes and about 90 minutes, for example comprised between about 25 minutes and about 60 minutes, from the extraction of the tyre from the curing station 20, i.e. from the end of the curing operations (post-curing operations included, if any). It is thus possible to exploit in an optimal way the remaining heat of the cured tyre CT.

The times indicated above can include a certain "rest time", namely an interval of time in which the tyre, after the curing process, and in particular after its extraction from the curing unit, stands next to the curing unit itself in order to lower its temperature, before moving it towards the verification operations and the subsequent storage. Such interval of time is advantageously provided in order to avoid the tyre to undergo external mechanical stresses that, when the temperature of the tyre is still very high, can damage its structural integrity.

Preferably, the detection of the first electromagnetic radiations R1 is performed when the cured tyre CT has an average temperature substantially comprised between about 50° C. and 90° C., for example substantially equal to 70° C.

The first electromagnetic radiations R1 are infrared radiations having a wavelength comprised, for example, between 5 μm and 20 μm.

Advantageously, the first electromagnetic radiations R1 detected are emitted by different portions of the cured tyre CT; preferably the first electromagnetic radiations R1 detected are emitted by the whole surface of the cured tyre CT, so that a thorough and reliable analysis of the whole tyre can be carried out.

In particular the detection of the first electromagnetic radiations R1 comprises one or more among: a detection of a first portion of the first electromagnetic radiations R1, emitted by a tread band T of the cured tyre CT; a detection of a second portion of the first electromagnetic radiations R1, emitted by a carcass structure C and/or a liner L of the cured tyre CT; a detection of a third portion and/or a fourth portion of the first electromagnetic radiations R1, emitted by at least one sidewall S1, S2 of the cured tyre CT, and preferably by both first and second sidewalls S1, S2.

Preferably all the detections indicated above are carried out.

As schematically shown in FIG. 1, a plurality of curing stations 20 (for example two curing stations) can be associated to a single control station 30: this allows to optimize the execution time of the analysis, since, while a certain tyre is being analyzed by the control station 30, the curing process of a subsequent tyre can be completed at the curing station 20. By synchronizing in an suitable way the process, it is possible to make sure that each cured tyre CT, once the curing operation has ended, can be collected and analyzed by the control station 30, in order to exploit as much remaining heat as possible.

As said, the first portion of the first electromagnetic radiations R1 is detected by means of the first detection device 32a.

Preferably, the cured tyre CT is rotatably moved in relation to the first detection device 32a, so that the latter can detect the electromagnetic radiations emitted by all the portions of the tread band T that are, one after the other in a sequence, in front of such first detection device 32, and thus it can carry out a circumferentially complete detection.

In particular, the cured tyre CT is rotatably moved around its rotation axis X.

Such operating mode of the control station 30 is schematically shown in FIG. 2a, wherein the arrow A indicates by way of example the direction of rotation of the cured tyre CT during the detection of the first portion of the first electromagnetic radiations R1.

Preferably, such movement is carried out by the first drive member 32b.

Preferably, the second portion of the first electromagnetic radiations R1 is detected by means of the second detection device 32c.

Preferably the second detection device 32c operates while the cured tyre CT is rotatably moved relative to the second detection device 32c itself, so that the latter can detect the electromagnetic radiations emitted by the portions of carcass structure C and/or of liner L that, in a sequence, are positioned in front of the second detection device 32c.

Preferably, the second device 32c is activated while also the first detection device 32a is active, namely while the first drive member 32b moves the cured tyre CT.

Preferably during the rotation movement of the cured tyre CT also the third detection device 32d is activated, so that the latter can detect the electromagnetic radiations emitted by the portions of first sidewall S1 that, in a sequence, are positioned in front of the third detection device 32d itself.

Advantageously, the third detection device 32d operates in a substantially simultaneous way with respect to the first and/or to the second detection device 32a, 32c, namely during the movement driven by the aforementioned first drive member 32b.

Preferably the method further comprises a movement of the cured tyre CT from the first operating position W1, wherein the first, the second and the third portion of the first electromagnetic radiations R1 are detected, to the second operating position W2.

Preferably the movement from the first to the second operating position W1, W2 is carried out by the second drive member 32e.

When the cured tyre is in the second operating position W2, the fourth portion of the first electromagnetic radiations R1 emitted by the second sidewall S2 is detected.

Preferably such detection is carried out by the fourth detection device 32f.

In particular, in order to detect the fourth portion of the first electromagnetic radiations R1, the cured tyre CT is preferably rotatably moved around its own axis of rotation.

Preferably, such movement is carried out by the third drive member 37g.

Thus, during a rotation movement of the cured tyre CT, the fourth detection device 32f can detect the electromagnetic radiations emitted by the portions of the second sidewall S2 that, in a sequence, are positioned in front of the fourth detection device 32f itself.

It has to be noted that the movements described above are to be intended, in general, as mutual movements of the cured tyre CT and of the detection devices 32a, 32c, 32d, 32f. In the embodiment described in detail, the movement is preferably actively performed on the cured tyre CT—in particular the rotation movement round the axis X. In different embodiments, however, the detection devices 32a, 32c, 32d, 32f are actively moved relative to the cured tyre CT.

Figure 4:
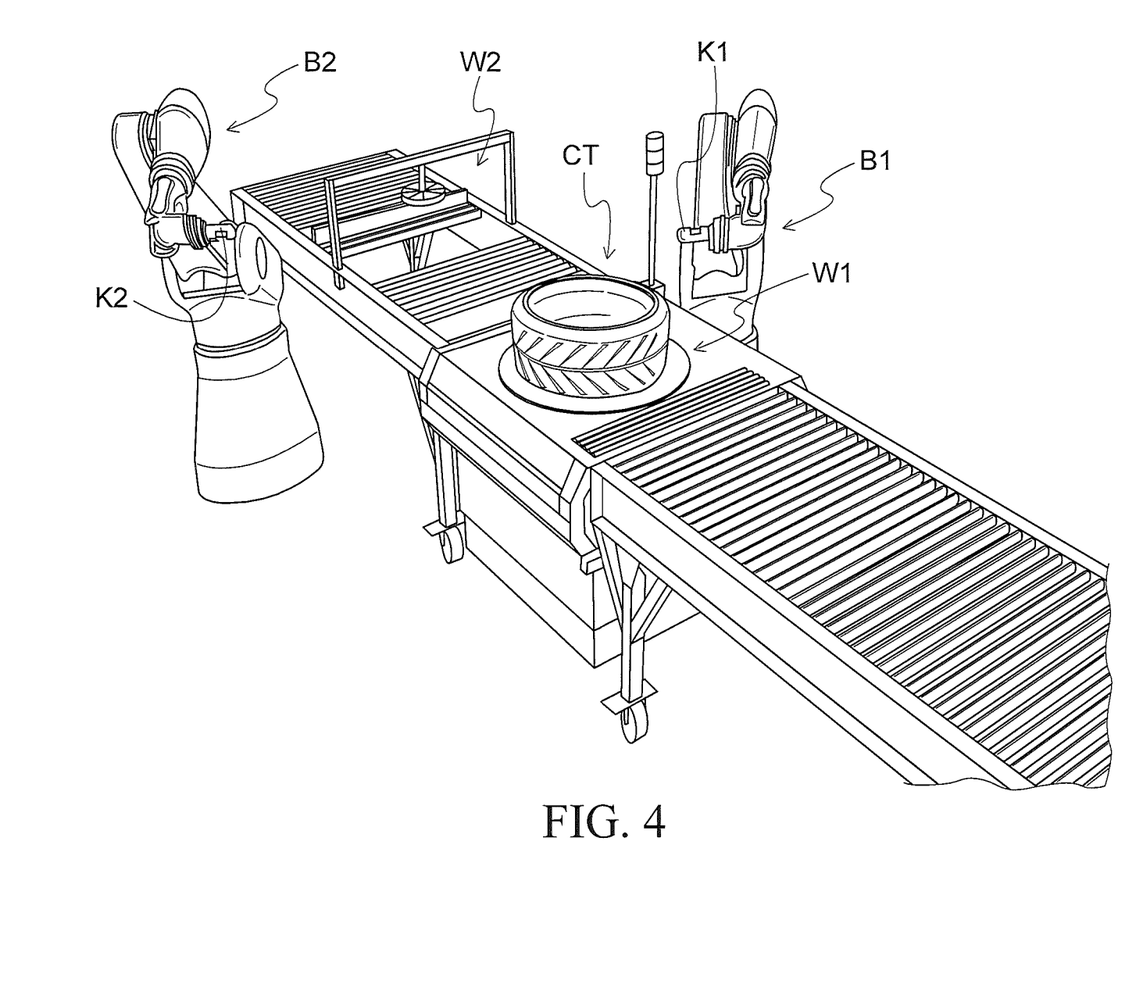
FIG. 4 schematically shows an alternative embodiment of the station of FIG. 3.

Also, the detection devices, instead of being constrained to the frame Y, can be mounted on respective robotized arms, as schematically shown in FIG. 4. In such embodiment, the robotized arms B1, B2 position the detection devices K1, K2 in an appropriate way in relation to the cured tyre CT.

In particular, the detection device K1 can be positioned, in a sequence, according to an order that does not necessarily correspond to the one presented here, in the proximity of the tread band T, in the proximity of the carcass structure C and/or of the liner L, and in the proximity of the first sidewall S1, in order to detect the first, second and third portion of the first electromagnetic radiations R1. During such detections, the cured tyre CT is rotatably moved around its axis X, preferably by the aforementioned first drive member 32b.

The detection device K2 is, instead, positioned in the proximity of the second sidewall S2, exploiting the interruption in the support rollers arranged at the second operating position W2 of the cured tyre CT. Thus the first electromagnetic radiations R1 emitted by the second sidewall S2 can also be detected, namely the fourth portion of the first electromagnetic radiations R1.

Once the detection has ended, at least an output signal OS is generated, representative of the first electromagnetic radiations R1 detected.

In particular, the output signal OS is representative of one or more among the first, the second, the third and the fourth portion of said first electromagnetic radiations R1.

Preferably, the output signal OS is representative of the first, the second, the third and the fourth portion of the first electromagnetic radiations R1.

Preferably, the output signal OS is sent to a display unit 40 to display a thermographic image of the cured tyre CT defined by the detection of the first electromagnetic radiations R1.

In practice, the output signal OS contains all the descriptive data of a thermographic image representative of the detection of the first electromagnetic radiations R1. The thermographic image can be displayed, for example, as an image wherein a respective colour, or colour shade, is associated to each temperature or range of temperatures, so that a possible uneven cooling of the cured tyre CT, due to defects and/or anomalies, can be easily identified in a visual way.

The analysis of the thermographic image can be carried out visually by a human operator who, when he/she detects the unevenness, inhomogeneities, signals the event in an appropriate way or intervenes consequently.

For example, in case an under-cured area is detected, the vulcanization bladder of the curing station is immediately controlled. Possibly, such vulcanization bladder can be replaced in case a defect of the latter emerges.

Advantageously, the procedure described above is carried out is a very short time, so that the number of tyres manufactured in the same curing unit is minimized.

Preferably, at least one parameter P1 descriptive of said first electromagnetic radiations R1 is determined.

Preferably the at least one parameter P1 is determined as a function of the aforementioned output signal OS.

In particular, the parameter P1 is descriptive of a heat distribution in said cured tyre CT. The at least one parameter P1 is then compared with at least a respective predetermined reference parameter Ref. A notification signal NS can be generated as a function of said comparison.

More in detail, the at least one reference parameter Ref comprises one or more parameters representative of detections carried out on one or more cured tyres distinct from (i.e. other than) said cured tyre CT.

In practice, such values can result from a statistics derived from other tyres, whose results are values reliably correlated to a tyre, or tyre portion, that is substantially devoid of defects.

In addition or as an alternative, the at least one reference parameter Ref may comprise one or more parameters representative of detections carried out on one or more different parts of the same cured tyre CT.

In other words, with such type of parameter, it is possible to compare a portion of the tyre CT with other portions of the same tyre which are expected to have similar and analogous characteristics with respect to the examined portion.

For example, it is thus possible to verify characteristics of the liner, virtually dividing the latter in a plurality of portions and evaluating the uniformity of behaviour of such portions with respect to each other.

In practice, by examining a certain portion of the liner, it is possible to verify if such portion has a similar behaviour to the one of the other portions which form the liner. From a graphical perspective, the fact that substantially all the liner portions have the same behaviour during the emission of the second portion of the first electromagnetic radiations R1 is represented by a substantial uniformity in colour, on in the colour shade, of the portion of the thermographic image corresponding to the liner itself.

In addition or as an alternative, the at least one reference parameter Ref may comprise one or more pre-stored parameters. Preferably such pre-stored parameters are descriptive of a reference tyre, substantially devoid of defects or anomalies. By comparing the at least one parameter P1 with such pre-stored parameters, it is thus possible to determine if the cured tyre can be considered as sufficiently similar to the aforementioned reference tyre and thus has appropriate characteristics in terms of homogeneity and uniformity of its own structure.

Preferably, the at least one reference parameter Ref may comprise one or more data representative of a defect or anomaly previously stored and/or directly identified, so that the latter can be identified again, in case it was detected again during the analysis.

By way of example, said at least one reference parameter Ref can comprise one or more data representative of an air inclusion which can be present in said cured tyre CT. Such data can for example correspond to a particular difference in the colour shade of a thermographic image.

A notification signal NS can be of the acoustic and/or of the visual type, so that it can draw the operator's attention who will be able to appropriately discard the tyre or make sure it is subjected to further investigations, and/or to adjust one or more apparatus being part of the plant 1, and in particular a building station 10, in order to avoid such defects and/or anomalies detected to further affect also the subsequent production.

By way of example, the notification signal NS can cause a stop of the operations carried out in the curing station 20, for example in case the detected defect is particularly relevant. The operator can thus intervene on the plant, and in particular on the curing station 20 itself, in order to remove the cause of such defect.

In general, the notification signal NS can be modulated over three logic levels, corresponding to the respective signals mode: a first level, representative of the fact that the cured tyre CT substantially does not have any defect or anomaly, and can thus continue, for example, towards storage areas or subsequent treatment stations; a second level, representative of the fact that a defect of limited gravity is present: in this case the operator is alerted and he/she will be able to both check the plant and carry out a further verification of the tyre to investigate the evaluation of the defect signalled; a third level, representative of the fact that the defect is such as to make the tyre unsuited for selling and for use, and that such tyre has thus to be discarded. Also in this case the operator will be called to control the operating conditions of the plant, and in particular of the curing station, in order to avoid that defects of such nature will be found in too many tyres.

In an embodiment, the method according to the invention comprises a further verification operation, carried out subsequently with respect to the thermographic analysis described above.

In more detail, the cured tyre CT can be subjected to second electromagnetic radiations R2 (FIG. 5) generated by a source 50.

Figure 5:
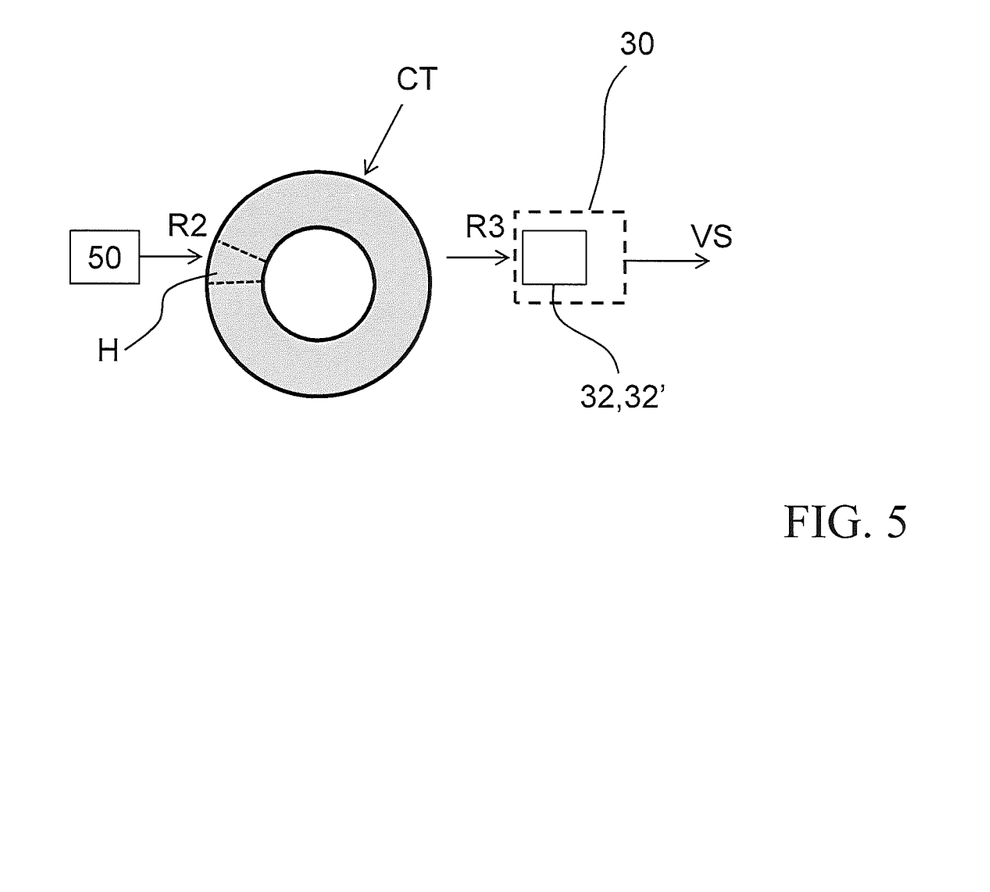
FIG. 5 shows a block diagram representative of the execution of further operations according to an embodiment of the invention.

The second electromagnetic radiations R2 can be infrared radiations having a wavelength comprised for example between 5 µm and 20 µm.

The source 50 can be, for example, an industrial infrared lamp, preferably provided with a focusing system. In a preferred embodiment, the source 50 emits a grazing light.

In an embodiment, the source 50 comprises a plurality of emitters, arranged so that different portions of the cured tyre CT can be irradiated.

By means of a detection system, which can be the aforementioned detection structure 32 or a similar system 32', having substantially the same functions, third electromagnetic radiations R3 are detected, namely the heat emitted by the cured tyre CT after being heated by the second electromagnetic radiations R2.

An analysis is then carried out on the third electromagnetic radiations R3 analogously to the one carried out for the first electromagnetic radiations R1: as a function of the response provided by the single portions of, the cured tyre CT, possible defects and/or anomalies are identified.

Preferably the verification is not carried out on the whole cured tyre CT, but only on the portions that, following the analysis carried out by means of the first electromagnetic radiations R1 (namely by means of the emission of the remaining heat accumulated by the tyre during the curing process) had shown a different behaviour from the one desired.

In other words, the further verification operation may comprise:

identifying, as a function of said output signal OS, one or more portions H of said cured tyre CT which have defects and/or anomalies;

heating said one or more portions H identified by subjecting them to second electromagnetic radiations R2;

detecting third electromagnetic radiations R3 emitted by said one or more portions H while the latter are releasing the heat accumulated by receiving the second electromagnetic radiations R2;

generating, as a function of said third electromagnetic radiations R3, a verification signal VS representative of the verification carried out on said portions H.

Thus it is possible to perform a further check (for example a second level check) of the presence of defects and/or imperfections on the cured tyre CT, and thus make the whole technique of analysis more reliable.

It has to be noted that the verification operation may be particularly efficient, since it can be carried out only on the aforementioned portions H, reducing the time and the energy consumption necessary for the activity.

In an embodiment, the verification signal VS may comprise a new thermographic image, realized on the basis of the third electromagnetic radiations R3 detected.

In addition or as an alternative, the verification signal VS may comprise a signalling generated in an automated way and representative of one or more defects and/or anomalies present on the cured tyre CT.

In other words, the verification signal VS may have either the same content as the aforementioned output signal OS or the same content as the aforementioned notification signal NS.

By way of example, one can consider the detection of an air inclusion: it is characterized by a different thermal conductivity and inertia with respect to the rest of the structure of the cured tyre. The air inclusion thus reaches different temperatures from the remaining part of the tyre: in particular, it tends to heat up more quickly and, after the exogenous stimulus is ended (namely the irradiation actuated by the source 50), it tends to cool again more quickly. This behaviour can be identified initially by means of the first electromagnetic radiations R1 and then it can be confirmed by using the source 50 and by detecting the third electromagnetic radiations R3.

Furthermore, by using an industrial lamp as a source characterized by a remarkable emission also in the field of short and medium waves, it will be possible to adequately focus the exogenous emission, making the irradiation process more rapid and precise.

The invention claimed is:

1. A method for controlling the manufacture of tyres for wheels of vehicles, comprising:
   extracting a cured tyre from a curing station, in which said cured tyre has accumulated heat during a curing process; and
   verifying the presence of any defects or imperfections in said cured tyre, wherein said verification comprises:
   detecting first electromagnetic radiations representative of heat emission from different portions of said cured tyre while said cured tyre is releasing said accumulated heat; and
   providing at least one output signal representative of said first electromagnetic radiations detected, in order to allow an analysis of said cured tyre and to verify the presence of said any defects or imperfections.

2. A method according to claim 1, wherein said first electromagnetic radiations are infrared radiations having a wavelength preferably between 5 μm and 20 μm.

3. The method according to claim 1, wherein said output signal is sent to a display unit to display a thermographic image of said cured tyre defined by the detection of said first electromagnetic radiations.

4. The method according to claim 1, comprising:
   determining at least one parameter descriptive of said first electromagnetic radiations detected;
   carrying out a comparison between said at least one parameter and at least one respective preset reference parameter; and
   generating a notification signal as a function of said comparison.

5. The method according to claim 4, wherein said at least one parameter is descriptive of a heat distribution in said cured tyre.

6. The method according to claim 4, wherein said at least one reference parameter comprises one or more parameters representative of detections carried out on one or more tyres other than said cured tyre.

7. The method according to claim 4, wherein said at least one reference parameter comprises one or more parameters representative of detections carried out on one or more different parts of said cured tyre.

8. The method according to claim 4, wherein said at least one reference parameter comprises one or more prestored parameters.

9. The method according to claim 1, wherein detecting said first electromagnetic radiations comprises one or more of the following operations:
   detecting a first portion of said first electromagnetic radiations, emitted by a tread band of said cured tyre;
   detecting a second portion of said first electromagnetic radiations, emitted by a carcass structure and/or by a liner of said cured tyre; and
   detecting a third portion of said first electromagnetic radiations, emitted by at least one first sidewall of said cured tyre.

10. The method according to claim 9, wherein detecting the first portion of said first electromagnetic radiations comprises:
    rotatably moving said cured tyre relative to at least one first detection device, which is configured and active to detect the first portion of said first electromagnetic radiations, and is arranged in a radially external position with respect to said tread band.

11. The method according to claim 9, wherein detecting the second portion of said first electromagnetic radiations comprises:
    rotatably moving said cured tyre relative to a second detection device, which is configured and active to detect the second portion of said first electromagnetic radiations, and is arranged in a radially internal position with respect to said carcass structure and/or said liner.

12. The method according to claim 11, wherein detecting the first portion of said first electromagnetic radiations comprises rotably moving said cured tyre relative to at least one first detection device, which is configured and active to detect the first portion of said first electromagnetic radiations, and is arranged in a radially external position with respect to said tread band, and comprising:
    activating said first and said second detection devices during the same rotation movement of said cured tyre.

13. The method according to claim 9, wherein detecting the third portion of the first electromagnetic radiations comprises:
    rotatably moving said cured tyre relative to a third detection device, which is configured and active to detect the third portion of said first electromagnetic radiations, and is arranged in front of at least one portion of said at least one first sidewall.

14. The method according to claim 13, wherein detecting the first portion of said first electromagnetic radiations comprises rotably moving said cured tyre relative to at least one first detection device, which is configured and active to detect the first portion of said first electromagnetic radiations, and is arranged in a radially external position with respect to said tread band, wherein detecting the second portion of said first electromagnetic radiations comprises rotably moving said cured tyre relative to a second detection device, which is configured and active to detect the second portion of said first electromagnetic radiations, and is arranged in a radially internal position with respect to said carcass structure and/or said liner, and wherein said third detection device is activated during a rotation movement of said cured tyre while said first detection device and/or said second detection device are also active.

15. The method according to claim 1, wherein detecting said first electromagnetic radiations comprises:
    detecting a fourth portion of said first electromagnetic radiations, emitted by a second sidewall of said cured tyre.

16. The method according to claim 15, wherein detecting the fourth portion of said first electromagnetic radiations comprises:
    rotatably moving said cured tyre relative to a fourth detection device, which is configured and active to detect the fourth portion of said first electromagnetic radiations, and is arranged in front of at least one portion of said second sidewall.

17. The method according to claim 16, wherein detecting said first electromagnetic radiations comprises one or more of the following operations:
    detecting a first portion of said first electromagnetic radiations, emitted by a tread band of said cured tyre;
    detecting a second portion of said first electromagnetic radiations, emitted by a carcass structure and/or by a liner of said cured tyre; and detecting a third portion of said first electromagnetic radiations, emitted by at least one first sidewall of said cured tyre;

wherein detecting the third portion of the first electromagnetic raditions comprises:

rotatably moving said cured tyre relative to a third detection device, which is configured and active to detect the third portion of said first electromagnetic radiations, and is arranged in front of at least one portion of said at least one first sidewall, comprising:

moving said cured tyre between a first operating position, in which said third detection device is in front of at least one portion of said at least one first sidewall to detect the third portion of said first electromagnetic radiations, and a second operating position, in which said fourth detection device is in front of at least one portion of said second sidewall to detect the fourth portion of said first electromagnetic radiations.

18. The method according to claim 1, which comprises, after detecting said first electromagnetic radiations:

heating one or more portions of said cured tyre by subjecting said one or more portions of said cured tyre to second electromagnetic radiations;

detecting third electromagnetic radiations emitted by said one or more portions while the latter are releasing the heat accumulated by receiving the second electromagnetic radiations; and generating, as a function of said third electromagnetic radiations, a verification signal representative of the verification carried out on said portions.

19. The method according to claim 18, wherein, prior to heating said one or more portions, said one or more portions are selected as a function of said output signal.

* * * * *